United States Patent
van Doren et al.

[11] Patent Number: 5,623,111
[45] Date of Patent: Apr. 22, 1997

[54] LIGATURE FOR THE MOUTHPIECE OF A SINGLE-REED WIND INSTRUMENT

[75] Inventors: Bernard van Doren, Paris; Marc Charpentier; Marc Hillion, both of La Londe Les Maures, all of France

[73] Assignee: Etablissements Vandoren, Paris, France

[21] Appl. No.: 560,195

[22] Filed: Nov. 21, 1995

[30] Foreign Application Priority Data

Nov. 23, 1994 [FR] France ................................. 94 14025

[51] Int. Cl.⁶ ................................................ G10D 9/02
[52] U.S. Cl. ............................................. 84/383 R
[58] Field of Search ................................. 84/383 R

[56] References Cited

U.S. PATENT DOCUMENTS 2,352,372 6/1944 Colarusso ........................ 24/19
2,648,246 4/1949 Mueller .......................... 84/383
4,056,997 11/1977 Rovner ........................ 84/383 R
4,080,866 3/1978 Toof ............................ 84/383 R

FOREIGN PATENT DOCUMENTS 2438311 4/1980 France .

Primary Examiner—Cassandra C. Spyrou
Attorney, Agent, or Firm—Scully, Scott, Murphy & Presser

[57] ABSTRACT

A flexible ligature made from an elastically deformable material, suitable for equipping the mouthpiece of a wind instrument is disclosed. The ligature has a profile complementary to the mouthpiece, so as to encircle the mouthpiece and reed. The ligature includes at least two threaded bores with opposite hand threads within two cylindrical elements in order to fasten two opposite parts of the ligature together. The two cylindrical elements are arranged within two sleeves and arranged to freely pivot about their axes.

6 Claims, 2 Drawing Sheets

LIGATURE FOR THE MOUTHPIECE OF A SINGLE-REED WIND INSTRUMENT

The present invention relates to a novel ligature for the mouthpiece of a single-reed wind instrument.

It is known that, in instruments such as the clarinet and the saxophone, the reed is held in place on the mouthpiece of the instrument by a ring, known as ligature, which matches the general shape of the mouthpiece and bears against the convex outer face of the reed, while the flat face of the reed is in contact with a flat part of the mouthpiece.

The ligature is split along one of its generatrices and fastening means, such as screws and threaded bores, are provided on the two opposite parts to join them together and thus clamp the reed.

A ligature of this type is described, for example, in French Patent No. 2 438 311, in the Applicant's name.

The screw-fastening system of these ligatures enables a graduated clamping action to be exerted on the reed, which is regarded as highly desirable by professional or experienced musicians but is comparatively complicated to employ because it requires successive tightening of the different screws.

Moreover, the clamping force is distributed unequally over the opposite parts of the ligature, leading to stresses distributed in a non homogeneous manner over the reed and the mouthpiece.

The present invention aims to overcome this problem by proposing a ligature which may be fitted to the mouthpiece of the wind instrument with the aid of a single clamping screw which, when tightened to press the reed against the mouthpiece of the instrument, exerts forces in opposite directions on the two opposite parts of the ligature, said forces being, however, substantially equal.

To this end, the subject of the invention is a flexible ligature made from an elastically deformable material, suitable for equipping the mouthpiece of a wind instrument, this ligature having a profile which is substantially complementary to that of the mouthpiece, so as to be able to encircle the latter and a reed inserted between the mouthpiece and the ligature, two parts of the ligature which are spaced apart and include respective opposite edges which are substantially parallel to the generatrices of the mouthpiece, this ligature being characterized in that the said two parts each include at least one threaded bore arranged opposite the bore of the other part transversely to the axis of the mouthpiece, the screw threads of the two bores having opposite hands, while a clamping screw, having two screw threads with opposite hands which are offset along its length and complement the screw threads of the two bores, is provided so as to interact with the latter in order to fasten the two opposite parts of the ligature together in an adjustable manner.

Clearly, by screwing the screw or screws simultaneously in each of the two associated bores, a virtually identical traction force in opposite directions will be exerted on the two opposite parts of the ligature, which will provide balanced and symmetrical clamping of the ligature on the mouthpiece of the instrument and on the reed with which it is equipped.

Use may be made of several screws, each associated with a set of two bores with opposite-handed screw threads, but, in an advantageous embodiment of the invention, use will be made of a single screw which will enable the instrumentalist to fit a reed to the mouthpiece of his instrument particularly easily.

Preferably, a cylindrical sleeve having an axis which is substantially parallel to that of the mouthpiece of the instrument will be provided on each of the opposite edges of the ligature, outside the latter, and each sleeve will accommodate a cylindrical element which is free to pivot about its axis in this cylinder, the threaded bores with which the clamping screw will interact being provided in these cylindrical elements, apertures naturally being provided in the sleeves opposite the bores for the screw to pass through. In this manner, while the screw is being loosened or tightened, the two opposite parts will be able to move freely with respect to each other and with respect to the mouthpiece of the instrument, while the cylindrical elements will pivot freely in their sleeve so that the bores they include remain permanently coaxial with the clamping screw.

In a preferred embodiment of the invention, a curved rigid element having a profile which complements that of the clarinet mouthpiece or of the reed, acting as a wedging element, is inserted between the mouthpiece or the reed and the opposite parts of the ligature so as to be pressed by the latter against the mouthpiece in the reed. This wedging element will include a part which projects between the two opposite parts of the ligature, the clamping screw being engaged in an aperture in this projecting part.

In this embodiment, the clamping force exerted by the screw in the direction of its axis will thus be converted into a pressure exerted on the element inserted between the body of the ligature and the mouthpiece or the reed of the instrument, perpendicularly to the mouthpiece, leading to an even more balanced distribution of the forces exerted by the ligature or the mouthpiece and the reed of the instrument.

An embodiment of the invention will be described below in greater detail, by way of example, with reference to the appended drawings. In these drawings.

Figure 1:
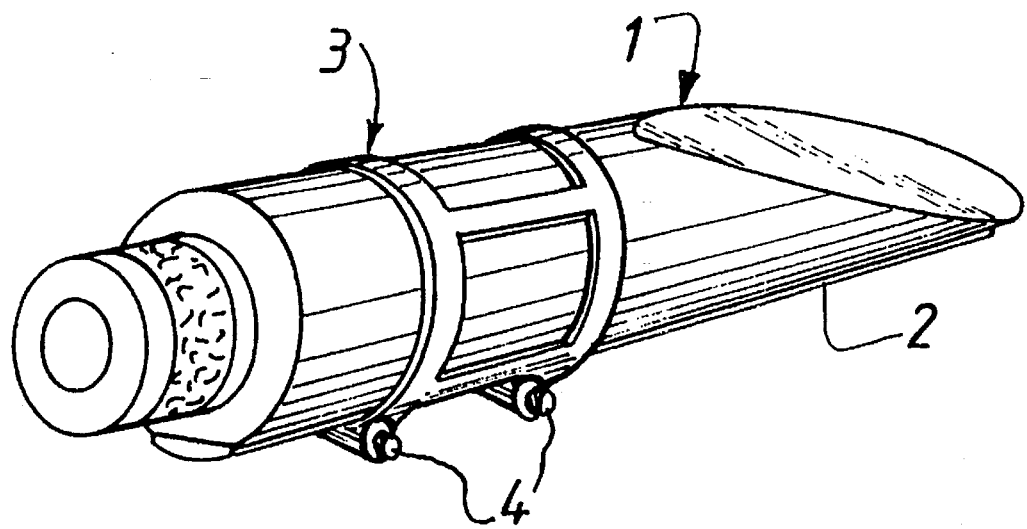
FIG. 1 is a perspective view of a ligature of the prior art, manufactured by the Applicant, in the position of use on a clarinet mouthpiece.

Reference will be made, firstly, to FIG. 1, in which the clarinet mouthpiece is denoted by the reference 1, the reed by the reference 2 and the body of the ligature of a known type, intended to hold the reed 2 on the mouthpiece 1, by the reference 3. The ligature body is made from an elastically deformable material, for example from metal or from plastic, and it has a generally cylindrical profile matching the shape of the mouthpiece 1 and of the reed 2. The ligature includes two clamping screws 4 which join spaced-apart opposite parts and enable the reed and the mouthpiece to be joined together, by clamping of the reed with the aid of the ligature.

The present invention aims to better distribute the clamping forces exerted by the ligature and to facilitate fitting of the reed on the mouthpiece by using a single clamping screw.

Figure 2:
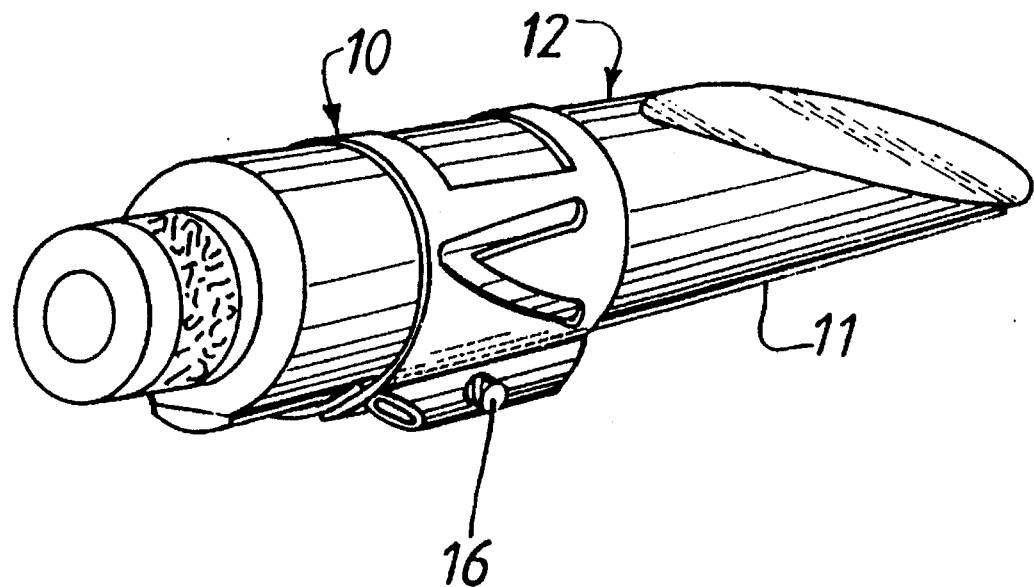
FIG. 2 is a view similar to FIG. 1 of an embodiment of the ligature according to the invention, also fitted on a clarinet mouthpiece.
Figure 3:
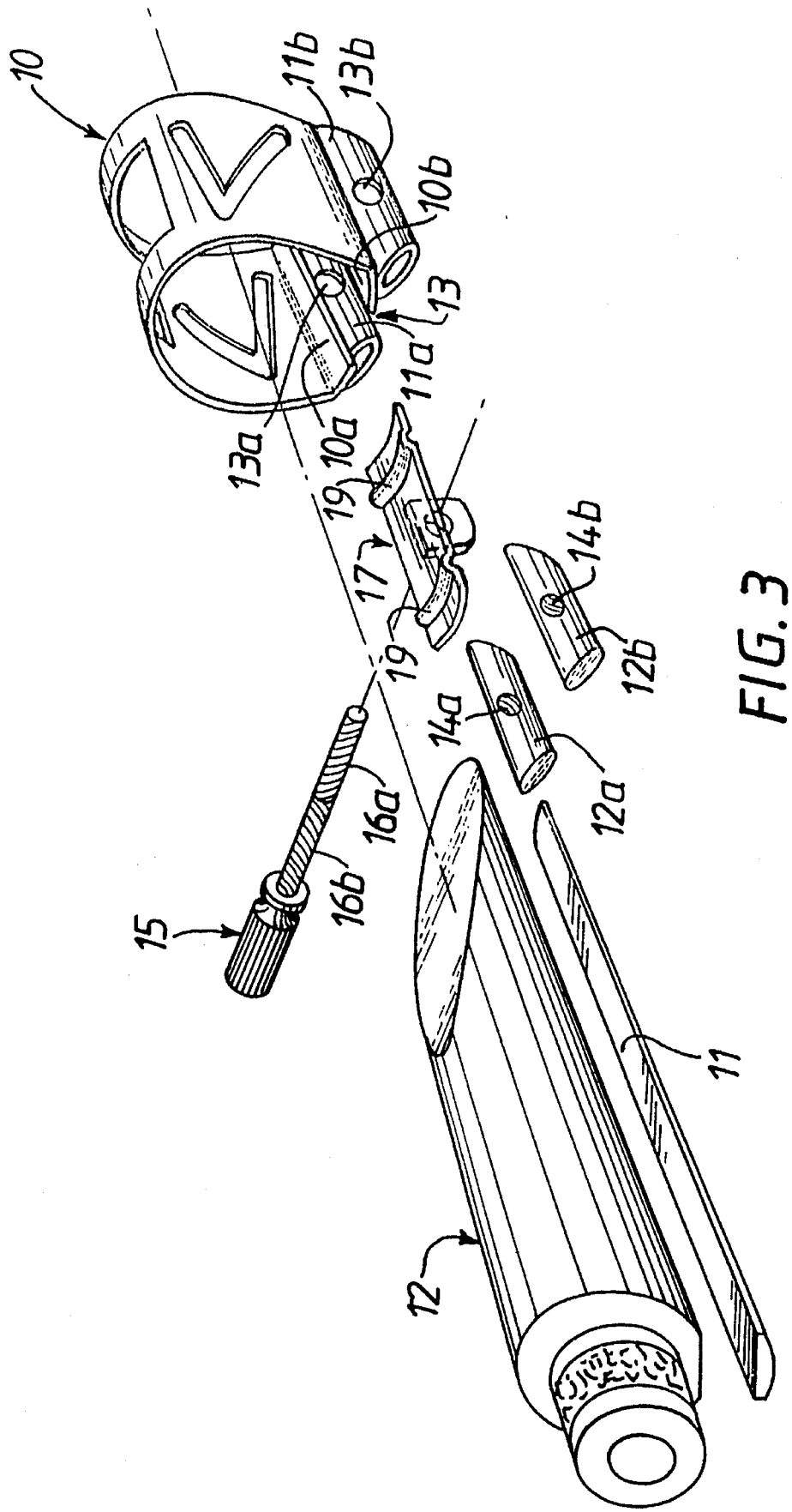
FIG. 3 is an exploded perspective view illustrating the various component parts of FIG. 3 [sic] more clearly.

To this end, as shown in FIGS. 2 and 3, the ligature body 10, intended to clamp the reed 11 on the clarinet mouthpiece 12, has, as previously, a cylindrical general shape and it is split at 13, parallel to the generatrices of the mouthpiece and to the reed 11, so as to include two opposite parts 10a and 10b which it is desired to bring together or separate from each other, in order to tighten or loosen the reed 11. Two cylindrical sleeves 11a, 11b, which accommodate two cylindrical elements 12a, 12b so that the latter can pivot freely about their axis, are integral with the parts 10a and 10b on the outside.

Apertures 13a, 13b are made in the sleeves 11a, 11b, while the elements 12a, 12b include, pierced transversely opposite these apertures, two internally threaded bores 14a, 14b, the screw threads of the two bore [sic] having opposite hands.

A screw 15 including two offset threaded parts 16a, 16b, having screw threads with opposite hands complementing those of the bores 14a, 14b, is engaged in the latter bores, through the apertures 13a, 13b of the sleeves 11a, 11b.

Because of the opposite hands of the screw threads of the parts 16a, 16b of the screw 15 on the one hand, and of the bores 14a, 14b on the other hand, it is possible to tighten or loosen the ligature 10 on the mouthpiece 12 and the reed 11, whilst distributing the forces exerted on the two parts 10a and 10b perfectly and symmetrically.

Preferably, the apertures 13a and 13b have an oval shape in a direction favorable to the movement of the clamping screw when the cylindrical elements 12a–12b pivot in the sleeves 11a, 11b.

As shown in FIG. 3, a curved wedging element 17, having a profile which complements that of the reed 11, is advantageously inserted between the latter and the parts 10a and 10b of the ligature. A part 18 of the wedging element 17 projects outward between the parts 10a, 10b and includes an aperture 18 in which the shank of the screw 15 is engaged. By tightening this screw, the traction forces exerted on the parts 10a, 10b of the ligature parallel to the axis of the screw 15, in order to bring them closer together, are thus transmitted to the element 17 in the form of a compression, firmly pressing this element 17 against the reed, perpendicularly to the latter, so as to distribute the clamping forces even better. Advantageously, the wedging element 17 will include, on its face which is turned toward the mouthpiece, in a plane perpendicular to the axis of the mouthpiece, ribs 19 which project in the direction of the mouthpiece.

Alternatively, the wedging element 17 may be pressed against the mouthpiece 12, the form of which it will then complement. The overall force distribution effect is the same as previously.

It will be noted that the element 17, which bears on the reed, acts independently of the ring of the ligature, which encircles the mouthpiece. It will also be noted that the lateral edges of the reed are not in contact with the ring.

The body 10 of the ligature may, in a known manner, be made from a rigid or elastically deformable material, for example from a metal or alloy or from plastic. This body and the wedging element 17 may, if desired, be sheathed in rubber, in a flexible plastic or in an elastomer, thus preventing the ligature slipping with respect to the mouthpiece and to the reed and giving the ligature greater flexibility.

The invention therefore provides a means which is extremely simple and particularly easy to operate for fixing a reed to the mouthpiece of a wind instrument, while distributing the clamping forces exerted on the mouthpiece and on the reed in a symmetrical and balanced manner. The use of a single clamping screw, moreover, greatly facilitates the instrumentalist's operations of changing a reed.

We claim:

1. A flexible ligature made from an elastically deformable material suitable for fastening a reed to a mouthpiece of a wind instrument, said ligature comprising:

a body having a profile which is substantially complementary to that of the mouthpiece and which surrounds the mouthpiece and said reed which is inserted between the mouthpiece and the ligature;

first and second parts intergral with opposite ends of said body, said first and second parts being spaced apart and substantially parallel to a lower flat surface of the mouthpiece;

first and second cylindrical sleeves, each located along a respective outside edge of said opposite ends of said first and second parts, said first and second cylindrical sleeves each having at least two aperatures arranged opposite each other and transverse to the axis of the mouthpiece;

first and second cylindrical elements that are respectively arranged within said first and second cylindrical sleeves so that they can freely pivot about their axes, said first and second cylindrical elements each having at least one threaded bore arranged transverse to the axis of the mouthpiece and in line with said apertures, each one of said bores having screw threads of opposite hands; and at least one clamping screw having two screw threads with opposite hands which are offset along its length and complement the screw threads of said bores, said clamping screw passing through said apertures and threadedly engaging with said bores in order to fasten said first and second parts together in an adjustable manner.

2. The ligature according to claim 1, comprising one said clamping screw.

3. The ligature according to claim 1, wherein said apertures have an oval profile in a direction favoring the movement of the clamping screw when the cylindrical elements pivot in the sleeves.

4. The ligature according to claim 1, further comprising a rigid, curved wedging element having a profile which complements that of the reed and the mouthpiece, said wedging element being inserted between said reed and said first and second parts.

5. The ligature according to claim 4, wherein said wedging element includes a vertical support part which projects outward from said wedging element and between said first and second parts, said support part having a support aperture through which the clamping screw is placed.

6. The ligature according to claim 5, wherein said wedging element includes an outer face which faces the mouthpiece and includes ribs which project toward the reed in a plane perpendicular to the axis of the reed.

* * * * *